March 17, 1931.   H. O. BERG   1,796,279
MEASURING AND RECEPTACLE FILLING APPARATUS
Filed Sept. 22, 1928    2 Sheets-Sheet 1

Inventor
H. O. Berg
By his Attorney

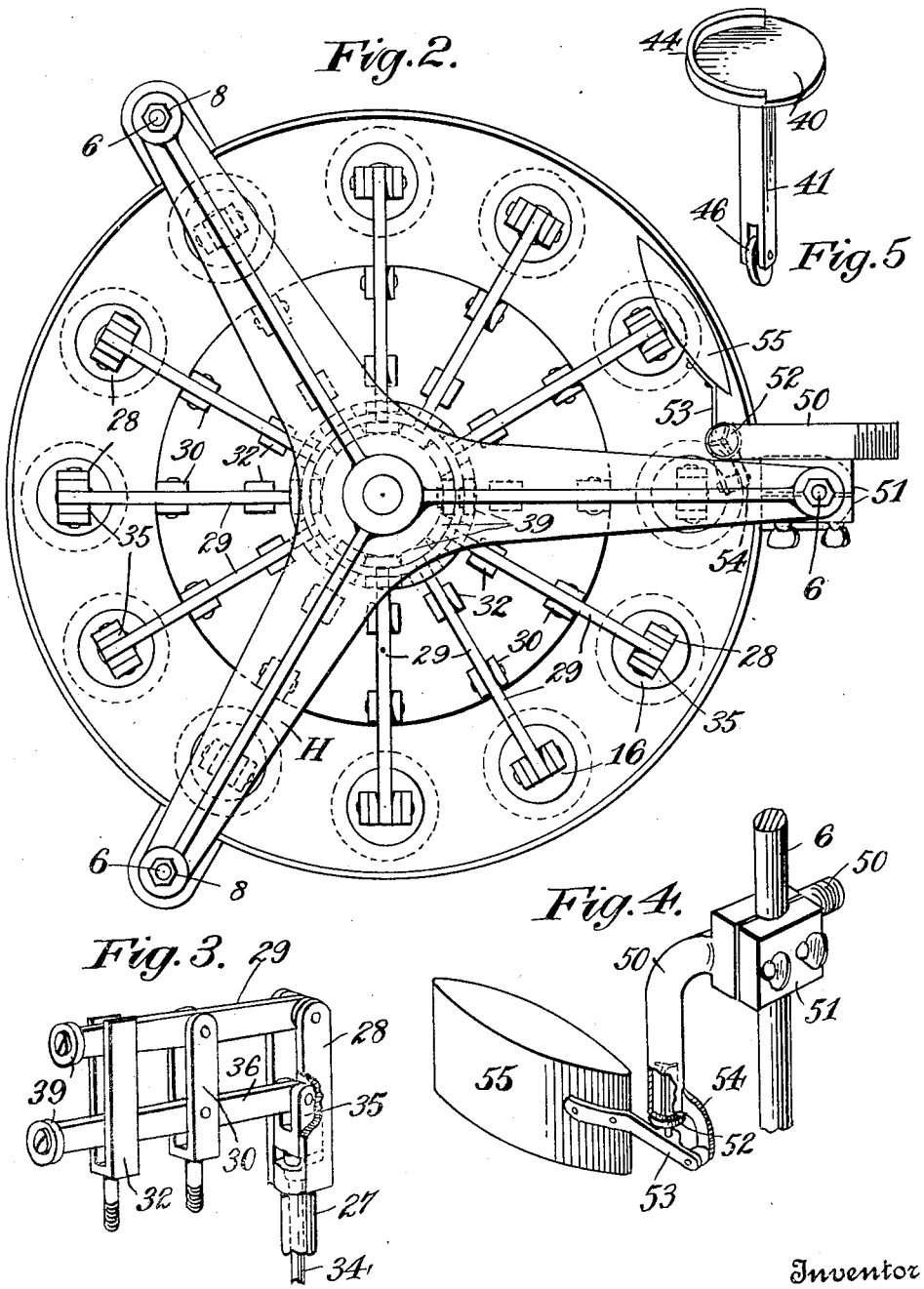

Patented Mar. 17, 1931

1,796,279

UNITED STATES PATENT OFFICE

HART O. BERG, OF NEW YORK, N. Y., ASSIGNOR, BY MESNE ASSIGNMENTS, TO SEAL-CONES, INC., OF NEW YORK, N. Y., A CORPORATION OF DELAWARE

MEASURING AND RECEPTACLE-FILLING APPARATUS

Application filed September 22, 1928. Serial No. 307,699.

This invention relates to measuring and receptacle filling apparatus of the rotatable type wherein a table is rotatable with a tank and measuring means and the table is arranged with carriers for receptacles to be filled adapted to be moved in a direction toward and away from the tank and measuring means, valve mechanism being provided for controlling the delivery of material from the tank to the measuring means and from the latter to receptacles on the receptacle carriers, and while the apparatus may be used for the handling of different materials it is particularly adapted for the measuring of milk and the filling of milk bottles, and it is the primary object of the invention to provide an improved and simplified construction and arrangement of apparatus of this character, which is cheap and novel in construction and efficient in use.

It is essential in apparatus of this character for the measuring and filling of receptacles with milk that the same be sanitary, and it is a further object of the invention to provide measuring and receptacle filling apparatus wherein all of the parts are exposed so that they may be readily cleansed without disassembling the same and wherein certain of the parts may be readily disassembled for cleansing the same or otherwise.

Another object of the invention is to provide improved constructed and arranged tank and measuring devices with valve mechanism to control the delivery of material from the tank to the measuring devices and from the latter to receptacles to be filled.

A further object of the invention relates to the provision of means adapted to be connected with a source of material supply for delivering material to the tank and to control the delivery of material from the source of supply and maintain a predetermined quantity of material in the tank so that there may be an uninterrupted operation of the apparatus.

Other objects and advantages will hereinafter appear.

In the drawings accompanying and forming a part of this application Figure 1 is an elevational view, partly in section, of apparatus illustrating an embodiment of the invention.

Figure 2 is a plan view.

Figure 3 is a perspective view, partly in section, of carrying and actuating means for the valves for controlling the passage of material from the tank to the measuring devices and from the latter to receptacles to be filled.

Figure 4 is a perspective view, partly in section, of inlet means from the source of supply to the tank and float controlled valve mechanism for regulating the delivery of material from said inlet means; and Figure 5 is a perspective view of a carrier for the receptacles.

Figure 1:
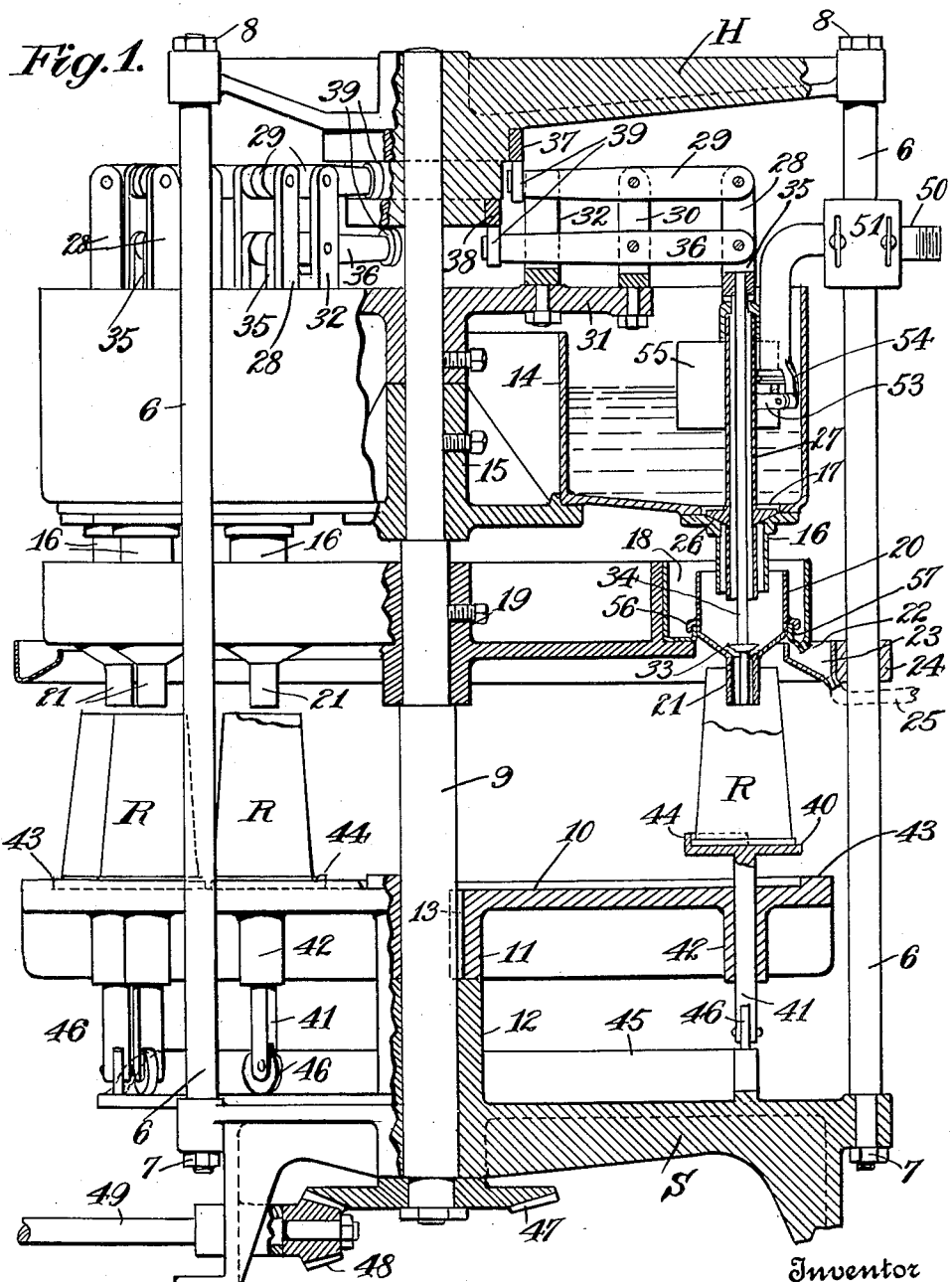

In carrying out the embodiment of the invention illustrated in the drawings there is provided a suitable supporting base for the apparatus, in the form of a standard S, with a head H in the form of a three arm spider mounted on the standard in superposed and spaced relation thereto by tie rods 6, by engaging the reduced threaded ends of said rods in openings in the standard and engaging nuts thereon, as at 7, and the head engaged upon the upper reduced threaded ends of said rods and retained thereon by nuts 8.

A shaft 9 is rotatably mounted in the standard and head with a table 10 mounted on and rotatable with the shaft above the standard and maintained in spaced relation thereto by a boss 11 extended axially from below the table engaging upon a boss 12 projecting upward from the standard. An anti-friction bearing may be interposed between the ends of said bosses. The table is fixed to the shaft as by keying, as shown in a general way at 13. An annular tank 14 open at the top and adapted to carry the material with which the receptacles are to be filled, in the present instance comprising liquid, is mounted on the shaft to rotate therewith in superposed and spaced relation to the table 10. The tank in the present arrangement is mounted upon the peripheral portion of the flange of a head 15 which is engaged upon a reduced portion of the shaft and supported against axial movement by abutting the shoulder formed by the reduced shaft portion. The material is discharged from the tank through nozzles 16 fixed to the tank in relation to openings 17 through and equidistantly spaced around the bottom of the tank, and the discharge of the material is controlled by valve mechanism hereinafter described.

An annular pan 18 is mounted on the shaft to rotate therewith in interposed relation to the tank and table, the pan being mounted upon the peripheral portion of the flange of a head 19 mounted on a portion of the shaft reduced relative to the portion of the shaft upon which the table is mounted and enlarged relative to the portion of the shaft upon which the tank carrying head is mounted, and said pan carrying head being supported against axial movement by abutting against the shoulder formed by the reduced shaft upon which it is mounted. A series of measuring devices in the form of cups 20 having a conical bottom with a nozzle 21 extended from the apex of said conical bottom, said measuring devices being mounted, preferably removably, in openings in and spaced about the bottom of the pan in equidistant spaced relation to the discharge nozzles from the tank and the pan arranged with the nozzle outlets of the measuring cups in line with said discharge nozzles of the tank. Overflow from the measuring cups empties into the pan 18 from which it flows through an outlet 22 in the bottom adjacent the peripheral wall portion of the pan into an annular pan 23 fixedly mounted on the head supporting rods 6, as at 24, to extend about and below the peripheral portion of the pan 18, said pan 19 having an outlet to which a conduit 25 is connected which may lead to a receiving tank or lead back to the tank 14 with a pump (not shown) interposed in the connection for delivering the material from the pan 23 to the tank 14.

The valve mechanism for controlling the delivery of material from the tank 14 to the measuring cups and from the latter comprises valves 26 in the form of disks having a conical undersurface for engaging correspondingly formed seats at the juncture of the nozzles 16 with the tank openings, said valves being fixed upon tubes 27 of a diameter less than the diameter of the nozzles and extending through the nozzles and up into the tank and connected at the upper ends to bifurcated heads 28 pivotally suspended from one end of levers 29 pivotally supported in the bifurcation of brackets 30 fixed in and extending upward from a head 31 mounted upon and rotatable with the shaft 9 and supported against axial movement by a hub portion thereof engaging with the tank carrying head 15, the levers being guided in their movements by the ends opposite to which the valve carrying tubes are connected engaging in the bifurcation of brackets 32 also fixed in and extending upward from the head 31. The valves for controlling the discharge of material from the nozzles of the measuring cups are also in the form of disks 33 having the undersurface of conical form to engage correspondingly formed seats at the juncture of the nozzles with the bottom of the cups, said valves being fixed upon rods 34 and extended through and of less diameter than the cup nozzles, and also extended up through the valve carrying tubes 27 and connected at the upper ends to bifurcated heads 35 within the tube carrying heads 28 whereby they are pivotally suspended from the end of levers 36 pivotally mounted in the bifurcation of the brackets 30 below the levers 29, the opposite ends engaging in the bifurcation of the bracket 32 to guide the levers in the movement thereof. The rods and tubes with the suspending levers therefor constitute the carrying and actuating means for the valves.

The flow of the material from the tank and measuring cups is by gravity, and the valves are normally seated by gravity and the weight of the material in the tank and cups on the valves to shut off the flow of material through the nozzles. The valves are unseated to permit of flow of material from the tank and cups by a pair of ring cams 37 and 38 with which cam following rollers 39 engage, said rollers being rotatably carried at the ends of the levers 29, 36 opposite to the ends connected with the tube and rod carrying heads 28, 35. The cam 38 is mounted upon the reduced end of a hub extended axially from the spider head, and the cam 37 is mounted on an enlarged portion of said hub, as clearly shown in Figure 1.

The receptacles R to be filled are carried by the table and positioned relative to the discharge nozzles of the measuring devices 20 by carriers mounted in the table to rotate therewith and have movement toward and away from the discharge nozzles of the measuring devices. These carriers comprise disk like members 40 carried by stems 41 mounted to have longitudinal sliding movement in the openings extended through the table and bosses projecting from the undersurface thereof, as at 42, and equidistantly spaced around the table to correspond with the spacing of the measuring devices. The stems are preferably of rectangular shape in cross section (Figure 5) and the openings through the table correspondingly formed, whereby the carriers are held against rotation. The carriers normally assume a position by gravity with the upper surface flush with the upper surface of a ledge 43 extended upward from and about the peripheral portion of the table, and the carriers are arranged with a gauge member to facilitate the positioning of the receptacles thereon, said gauge members comprising a segmental ledge 44 extended upward and about a peripheral portion of the carrier disk and arranged in opposed relation to the table ledge 43. The receptacles are positioned on the carriers in a direction inward from the marginal portion of the table and into abutting relation with the gauge ledge 44. During the filling operation the receptacles are positioned with the discharge nozzles of the measuring devices engaging in the top of the receptacles, as shown in Figure 1, and thus prevent splashing and spilling of the material with the consequent soiling of the receptacle and table. For this purpose there is provided an annular or ring cam member 45 extended upward from the standard S. This cam may be constructed integral with the standard, or separately therefrom and then fixed upon the standard. The carrier stems 41 are of a length to extend below the table bosses 42 and rotatably carry rollers 46 to engage and follow the cam 45, said rollers in the presence instance being rotatably mounted in a bifurcation at the end of the stems. The cam 45 is arranged whereby the rollers 46 will ride off from the cam and onto the table at one side portion, and in which position the receptacles are positioned upon the carriers. During this period of movement of the valves 26 for the discharge nozzles of the tank are actuated to permit of the flow of liquid from the tank to the measuring devices, the period for which said valves are retained in such position being timed to permit of a sufficient flow of liquid to fill the measuring devices and slightly overflow to assure the filling of said cups. As the receptacles on the carriers approach the opposite side of the table the carrier rollers ride up the cam and position the receptacles as shown in Figure 1 relative to the discharge nozzles of the measuring cups when the valves 33 for the discharge nozzles of the cups are actuated to permit of the gravity flow of liquid from the cups to the receptacles, the valves being so positioned for a period of time sufficient to permit of all the liquid to flow from the cups to the receptacles, when the rollers of the receptacle carriers will ride off from the cam and position the receptacles as shown at the left in Figure 1.

The tank carrying head 15, as well as the head 31 on which the valve carrying means is mounted and the pan carrying head 19 are preferably secured on the shaft 9 to rotate therewith by set screws whereby said heads may be adjusted on the shaft so as to register the measuring devices with the receptacle carriers and with the discharge nozzles of the tank as well as the valve mechanism for the discharge nozzles for the tank and measuring devices. The shaft 9 is rotated by suitable means, and in the present instance comprises a bevel gear 47 fixed to the shaft below the standard meshing with a pinion 48 fixed on a drive shaft 49 and the latter connected to a suitable source of power.

In order that the apparatus may be continuously operated and avoid the necessity of stopping the apparatus for refilling of the tank 14 it is connected with a source of material supply. For this purpose an inlet conduit 50 of right angle form is provided and arranged to be connected with the source of supply, said conduit being mounted on a carrier in the form of a pair of clamping members 51 whereby it is adjustably mounted on one of the supporting rods 6 for the head H with the outlet from one end of said conduit extended into the top of the tank, Figures 1 and 4. The flow of liquid through the conduit to the tank is regulated to maintain a predetermined quantity of liquid in the tank by float controlled valve mechanism, comprising a valve 52 arranged to seat against the inlet from the conduit, said valve having a stem whereby it is fixed in and carried by a lever 53 pivotally mounted at one end on an arm 54 extended laterally and downward from the conduit, said lever also serving as a carrier for a float 55 to which the opposite end of the lever is fixed. The float is of elliptical form in cross section and the float and valve carrier is arranged and mounted on the conduit so that the float will lie contiguous to the peripheral wall of the tank and clear the levers 29, 36 and the connecting means thereof with the valve carrying rods and tubes, as clearly shown in Figure 2.

The measuring cups 20 are preferably mounted in the openings of the pan 18 for which purpose the marginal portions of the cup receiving openings in the pan are flanged inwardly and upwardly, as at 56, and laterally and downwardly extending supporting rings 57 are arranged on the cups to engage over and support the cups on the opening flanges 56. By this arrangement material overflowing from the cups is directed into the pan and away from the connection of the cups with the pan.

From the construction and arrangement of apparatus as described it will be obvious that all of the parts are exposed and may be readily cleaned, as by steam from a hose or flushing with water.

It will also be obvious that various modifications may be made in construction and arrangement of parts, and that portions of the invention may be used without others and come within the scope of the invention.

Having thus described my invention I claim:

1. In receptacle filling apparatus, a standard, a head mounted in fixed position upon said standard and in superposed relation thereto, a shaft rotatably mounted in the standard and head, a table mounted on and rotatable with the shaft superposed to the standard, a liquid carrying tank mounted on and rotatable with the shaft superposed to the table and having discharge nozzles leading therefrom, measuring devices, a carrier for said measuring devices mounted on and rotatable with the shaft with the measuring devices in interposed relation to the tank and table, said measuring devices being arranged to receive liquid discharged from the tank nozzles and having discharge nozzles, valve mechanism to control the discharge of liquid from the tank nozzles to the measuring devices and from the nozzles of the latter to receptacles carried by the table, cams carried by the head, and means connected with the valve mechanism and movable relative to said cams by the rotation of the shaft to actuate the valve mechanism.

2. Receptacle filling apparatus as claimed in claim 1, wherein the discharge nozzles from the tank lead from the bottom thereof and are equidistantly spaced around the same, and the measuring devices being arranged below the tank with the nozzles thereof in alinement with the tank nozzles, and the valve mechanism for the nozzles for measuring devices arranged concentric of the valve mechanism for the tank nozzles.

3. Receptacle filling apparatus as claimed in claim 1, wherein the measuring devices are cup members and the carrier therefor is a pan to receive overflow from the cups.

4. Receptacle filling apparatus as claimed in claim 1, wherein the valve mechanism to control the discharge of liquid from the tank and measuring devices comprises valves to co-operate with seats in the nozzles of the measuring devices, rods carrying said valves, valves to co-operate with seats in the discharge nozzles of the tank, tubes carrying said latter valves through which the valve carrying rods are extended, levers to which the valve carrying rods and tubes are connected, and a carrier on which said levers are mounted rotatable with the tank, measuring devices and table.

5. Receptacle filling apparatus as claimed in claim 1, wherein the valve mechanism to control the discharge of liquid from the tank and measuring devices comprises valves to co-operate with seats in the nozzles of the measuring devices, rods carrying said valves, valves to co-operate with seats in the discharge nozzles of the tank, tubes carrying said latter valves through which the valve carrying rods are extended, levers to one end of which the valve carrying tubes and rods are connected and carrying rollers at the opposite ends, a carrier for the levers superposed to and rotatable with the tank, and the valve actuating cams are in the form of rings carried by the head with which the lever rollers cooperate during the rotation of the lever carrier to rock the levers and actuate the valve carrying rods and tubes.

6. In receptacle filling apparatus as claimed in claim 1, receptacle carriers mounted in the table to have movement toward and away from the discharge nozzles of the measuring devices.

7. In receptacle filling apparatus as claimed in claim 1, receptacle supports arranged with stems slidably mounted in the table, and a cam ring fixed upon the standard, and rollers carried by the stems of the receptacle supports below the table to engage and follow said cam to actuate the carriers with receptacles thereon toward the measuring devices and maintain them in such position during the period of discharge of liquid from the measuring devices and away from said devices when the discharge of liquid is shut off therefrom and during the period of discharge of liquid from the tank nozzles to said measuring devices.

8. Receptacle filling apparatus as claimed in claim 1, wherein the carrier for the measuring devices comprises an annular pan to receive overflow of liquid from the measuring devices, and the measuring devices comprise cups mounted in the pan with the discharge nozzles extended through openings in the bottom of the pan.

9. Receptacle filling apparatus as claimed in claim 1, wherein the discharge nozzles from the tank are equi-distantly disposed about and lead from the bottom of the tank, and the discharge nozzles for the measuring devices are arranged for the gravity flow of liquid therefrom and in line with the discharge nozzles of the tank, and the valve mechanism to control the discharge of the liquid from the discharge nozzles of the tank and measuring devices, comprises valves to be seated against seats arranged at the juncture of the nozzles with the tank and measuring devices, and means carrying said valves rotatable with the tank, measuring devices and table and movable relative to the cams to actuate the valve carrying means to move the valves toward and away from the valve seats.

10. In receptacle filling apparatus as claimed in claim 1, a liquid conduit arranged for connection with a source of liquid supply and having an outlet to the tank, a valve for the outlet, a float in the tank having an operative connection with the valve to actuate the valve through the rise and fall of the liquid level in the tank and maintain a predetermined quantity of liquid in the tank.

11. In receptacle filling apparatus, a standard, a head, means to mount the head on and support the same in superposed relation to the standard, a shaft rotatably mounted in the standard and head, a table fixed upon and rotatable with the shaft above the standard, a tank mounted on and rotatable with the shaft above the table and having discharge nozzles leading from and equidistantly disposed about the bottom of the tank for discharge of the liquid therethrough by gravity from the tank, a pan mounted on and rotatable with the shaft in interposed relation to the table and tank, measuring cups mounted in openings in the pan having nozzles for the gravity discharge of the liquid from the cups, said cups being arranged in alinement with the tank nozzles and the overflow therefrom adapted to be received by the pan, valves to control the discharge of liquid from the nozzles of the tank and measuring cups, valve carrying and actuating means, a disk mounted on and rotatable with the shaft above the tank upon which the valve carrying actuating means are mounted, means carried by the head relative to which the valve carrying and actuating means are moved to operate the valves, receptacle carriers mounted in the table in line with the discharge nozzles of the measuring cups and to have movement toward and away from said cups, a support for the receptacle carriers relative to which the carriers are moved by the rotation of the table and arranged to move the carriers with receptacles thereon toward the measuring cups and maintain them in such position during the period of discharge of liquid from the cups and permit said carriers to move the receptacles away from the cups when the discharge of liquid is shut off from the cups and during the period of discharge of liquid from the tank nozzles to the measuring cups, and means to rotate the shaft.

12. In receptacle filling apparatus as claimed in claim 11, an annular pan carried by the head support to receive liquid from the measuring cup carrying pan, a conduit adapted for connection with a source of liquid supply having outlet means in the tank, and a valve for the outlet means controlled by the quantity of liquid in the tank to regulate the flow of liquid to the tank.

13. Receptacle filling apparatus as claimed in claim 11, wherein the carrying and actuating means for the valves for the discharge nozzles of the cups and tank comprises tubes upon which the valves for the tank nozzles are mounted, rods extending through said tubes upon which the valves for the discharge nozzles of the measuring cups are mounted, bifurcated heads carrying said tubes and rods with the rod carrying heads arranged within the tube carrying heads, levers pivotally mounted on a disk mounted on and rotatable with the shaft above the tank from one end of which the tube and rod carrying heads are suspended, and rollers carried at the opposite ends of said levers, and the means to operate the valve carrying and actuating means comprising a pair of ring cams concentrically carried by the shaft supporting head and with which the lever rollers engage during the rotation thereof with the shaft.

14. Receptacle filling apparatus as claimed in claim 11, wherein the receptacle carriers are arranged with stems whereby they are slidably carried by the table, and the support for the receptacle carriers comprises a ring cam on the standard, and rollers carried by the stems of the receptacle carriers engaging with said ring cam to support and actuate the carriers.

Signed at the city of New York, in the county of New York and State of New York, this sixth day of September, 1928.

HART O. BERG.